United States Patent [19]

Teterwak

[11] Patent Number: 5,777,898
[45] Date of Patent: Jul. 7, 1998

[54] METHOD AND APPARATUS FOR ALIGNING A DIGITIZING PANEL WITH A DISPLAY DEVICE

[75] Inventor: Jerzy A. Teterwak, Colorado Springs, Colo.

[73] Assignee: Symbios Logic Inc., Fort Collins, Colo.

[21] Appl. No.: 704,456

[22] Filed: Aug. 19, 1996

[51] Int. Cl.$^6$ ........................................ G09G 5/00
[52] U.S. Cl. .................. 364/559; 395/174; 395/178; 395/179; 395/127; 395/133; 178/18
[58] Field of Search ........................ 178/18, 19; 345/173, 345/179, 174, 178; 395/127, 133; 364/559

[56] References Cited

U.S. PATENT DOCUMENTS

| | | | |
|---|---|---|---|
| 4,393,410 | 7/1983 | Ridge et al. | 358/488 |
| 4,575,581 | 3/1986 | Langberg | 178/18 |
| 4,603,231 | 7/1986 | Reiffel et al. | 178/19 |
| 4,650,926 | 3/1987 | Nakamura et al. | 178/18 |
| 4,831,566 | 5/1989 | Matthews et al. | 364/571.05 |
| 5,115,107 | 5/1992 | Crooks et al. | 178/18 |
| 5,149,919 | 9/1992 | Greanias et al. | 178/19 |
| 5,250,929 | 10/1993 | Hoffman et al. | 345/146 |
| 5,331,565 | 7/1994 | Hattori et al. | 364/472 |
| 5,373,117 | 12/1994 | Crooks et al. | 178/18 |
| 5,475,401 | 12/1995 | Verrier et al. | 345/179 |
| 5,589,856 | 12/1996 | Stein et al. | 345/173 |

*Primary Examiner*—Emanuel T. Voeltz
*Assistant Examiner*—Kaminis Shah
*Attorney, Agent, or Firm*—Paul J. Maginot; Wayne P. Bailey

[57] ABSTRACT

A method and apparatus for aligning a first coordinate system of a digitizing panel with a second coordinate system of a display device. The method includes the steps of displaying a plurality of reference points on the display device, each of the reference points having a $X_{ref}$, $Y_{ref}$ coordinate value, determining a plurality of first Xr, Yr coordinate values from the digitizing panel which are indicative of a plurality of positions of an object positioned relative to the plurality of reference points, determining a plurality of channel gain correction values from the plurality of first Xr, Yr coordinate, values and the plurality of $X_{ref}$, $Y_{ref}$ coordinate values, and storing the plurality of channel gain correction values for use in correcting a second Xr, Yr coordinate value which is indicative of a position of an object relative to the digitizing panel.

21 Claims, 7 Drawing Sheets

METHOD AND APPARATUS FOR ALIGNING A DIGITIZING PANEL WITH A DISPLAY DEVICE

BACKGROUND OF THE INVENTION

The present invention relates generally to digitizing panels, and more particularly to a method and apparatus for aligning a digitizing panel with a display device.

Digitizing panels having a resistive layer covered with a non-conductive plate such as glass, are known in the art. The known digitizing panels may operate in one of two modes, namely a touch mode or a pen mode. When operating in the touch mode, a computer is conventionally configured so as to bias the resistive layer with an AC signal. An object such as a user's finger that approaches and contacts the non-conductive plate acts as a load that is capacitively coupled to the resistive layer. The capacitively coupled load causes electric current to flow through the corners of the resistive layer. The computer may determine a Cartesian coordinate (X,Y) position of an object relative to the digitizing panel, based on the current low in each of the corners of the resistive layer in a manner known to one of ordinary skill in the art. More particularly, the position of the stylus relative to the digitizing panel may be determined based upon a ratio of the corner currents or signals that flow through the corners of the resistive layer due to the object being capacitively coupled to the resistive layer.

When operating in the pen mode, the computer is conventionally configured so as to be receptive to a signal transmitted from a hand-held pen or stylus. In particular, a stylus typically includes a battery portion which supplies power to an oscillator potion for stimulating a coil associated with a transmitter portion to transmit an AC signal from a tip of the stylus. The AC signal may be transmitted from the styli tip when the tip contacts an object or surface such as the non-conductive plate associated with the digitizing panel.

The transmitted AC signal is typically capacitively coupled to the resistive layer associated with the digitizing panel. The capacitively coupled AC signal induces an electric current flow through each of the corners of the resistive layer. As in the touch mode, the position of the stylus relative to the digitizing pane, may then be determined based upon a ratio of the corner currents or signals that flow through the corners of the resistive layer due to the AC signal transmitted from the stylus.

Typically, the digitizing panel is placed on top of a display device. One of the problems existing with known digitizing panels is aligning the digitizing panel with the display device such that the reported position of a stylus or a user's finger (the position detected by the digitizing panel) corresponds with the displayed position (the position displayed on the display device). For example, when a user moves an object such as a stylus or the user's finger across the digitizing panel, the display device typically displays digital ink (i.e. the activation of one or more pixels having an X, Y coordinate position which corresponds to the X, Y coordinate position of the object) underneath the tip of the object. However, for the display device to display digital ink underneath the tip of the object, the digitizing panel must be in precise alignment with the display device. Thus, any misalignment between the digitizing panel and the display device causes the display device to display digital ink that is not substantially underneath the tip of the object.

Misalignment, consists of at least four components: offset, scale, skew, and channel gain mismatch. Offset is caused by misalignment of the absolute origins between the digitizing panel and the display device. Scale misalignment is caused by an unequal distance per coordinate unit between the coordinate systems of the digitizing panel and the display device. Skew is caused by an apparent rotation between the coordinate system of the digitizing panel and the coordinate system of the display device. Channel gain mismatch is the relative gain mismatch of the channel pre-processors which generate values indicative of the magnitude of current flowing through the corners of the resistive layer associated with the digitizing panel. The channel gain mismatch results in a non-linear correlation between the coordinate system of the digitizing panel and the coordinate system of the display device.

Known methods for aligning a digitizing panel with a display device typically involve obtaining a set of X, Y coordinate positions which correspond to reference points displayed on the display device. More particularly, a number of reference points are consecutively displayed on the display screen and a user is instructed to touch an object (e.g. stylus) to each reference point. The position of the object when contacting each of the reference points is reported to a processing unit wherein the reported X, Y coordinate positions are used to solve a system of correction equations in order to obtain a plurality of correction factors. The correction factors and the correction equations are then used during normal processing to correct each pair of X, Y coordinates that are reported to the processing unit from the digitizing panel. The resulting corrected X, Y coordinate pair is used to display digital ink that should more closely align with the tip of an object that is contacting the digitizing panel.

U.S. Pat. No. 5,115,107, issued to Crooks on May 19, 1992, discloses an alignment method wherein a user is instructed to consecutively touch a stylus to three reference points which are displayed on a display device. The alignment method then solves a system of six correction equations to obtain six correction factors (an X-scale factor, a Y-scale factor, an X-offset factor, a Y-offset factor, an X-skew factor, and a Y-skew factor). Once the method obtains values for the six correction factors, the method corrects all further reported X, Y coordinates by using the six correction factors in conjunction with the correction equations.

The method of aligning a digitizing panel with a display device that is disclosed in U.S. Pat. No. 5,115,107 has several shortcomings. For example, because the method actually solves a system of equations, the method may only use a set number of reference points to obtain the correction factors. For example, the above method may only use three reference points (3 pairs of X, Y coordinate values) because the method solves a system of six equations with six unknowns. Furthermore, because the user may only touch the reference points displayed on the display device with limited accuracy, the disclosed method may be unable to obtain a solution to the system of correction equations if the user fails to touch the reference points with adequate accuracy. It should be appreciated that the inaccuracy associated with the user touching the stylus to only three reference points could be reduced if a larger sample of reference points was used. Furthermore, the disclosed method tails to correct for the imperfect channel gain matching between the channel pre-processors which generate values indicative of the corner current amplitudes of the resistive layer of the digitizing panel.

What is needed therefore is a method and an apparatus for correcting offset, sealing, skew, and channel gain mismatch

3 while permitting a greater number of reference points to be used than could be used by directly solving a system of correction equations.

SUMMARY OF THE INVENTION

In accordance with one embodiment of the present invention, there is provided a method for aligning a first coordinate system of a digitizing panel with a second coordinate system of a display device. The method includes the steps of displaying a plurality of reference points on the display device, each of the reference points having a $X_{ref}$, $Y_{ref}$ coordinate value, determining a plurality of first Xr, Yr coordinate values from the digitizing panel which are indicative of a plurality of positions of an object positioned relative to the plurality of reference points, determining a plurality of channel gain correction values from the plurality of first Xr, Yr coordinate values and the plurality of $X_{ref}$, $Y_{ref}$ coordinate values, and storing the purality of channel gain correction values for use in correcting a second Xr, Yr coordinate value which is indicative of a position of an object relative to the digitizing panel.

Pursuant to another embodiment of the present invention, there is provided a computer including a display device for displaying a plurality of reference points wherein each of the plurality of reference points has a $X_{ref}$, $Y_{ref}$ coordinate value, a digitizing panel mounted over the display device and having a resistive layer associated therewith, a plurality of channel pre-processors each connected to a respective corner of the resistive layer, a X, Y coordinate generator coupled to the channel pre-processors and configured to generate a plurality of Xr, Yr coordinate values indicative of a plurality of positions of an object positioned relative to the plurality of reference points, and a mechanism for obtaining a plurality of channel gain correction values from the plurality of Xr, Yr coordinate values and the plurality of $X_{ref}$, $Y_{ref}$ coordinate values.

Pursuant to a third embodiment of the present invention, there is provided a method for aligning a first coordinate system of a digitizing panel with a second coordinate system of a display device. The method includes the steps of displaying a plurality of reference points on the display device, wherein each of the reference points has a $X_{ref}$, $Y_{ref}$ coordinate value, determining a plurality of first Xr, Yr coordinate values from the digitizing panel which are indicative of a plurality of positions of an object positioned relative to the purality of reference points, and determining a plurality of channel gain correction values from the plurality of first Xr, Yr coordinate values and the purality of $X_{ref}$, $Y_{ref}$ coordinate values for use in correcting a second Xr, Yr coordinate value which is indicative of a position of an object relative to the digitizing panel.

It is therefore an object of the present invention to provide a new and useful method for aligning a first coordinate system of a digitizing panel with a second coordinate system of a display device.

It is also an object of the present invention to provide an improved method for aligning a first coordinate system of a digitizing panel with a second coordinate system of a display device.

It is also an object of the present invention to provide a new and improved computer.

It is also an object of the present invention to provide an improved computer.

It is also an object of the present invention to provide a new and useful method which reduces calibration error associated with a user touching a reference coordinate with a stylus.

It is yet a further object of the present invention to provide a new and useful method which adjusts reported coordinates for channel gain mismatch.

It is yet another object of the present invention to provide a new and useful method which obtains channel gain mismatch correction factors from reported coordinates.

It is yet another object of this invention to provide a new and useful computer which accurately reports position coordinates of a stylus relative to the digitizing panel.

It is yet a further object of the present invention to provide a new and useful computer which adjusts reported coordinates for channel gain mismatch.

The above and other objects, features, and advantages of the present invention will become apparent from the following description and the attached drawings.

DETAILED DESCRIPTION OF A PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
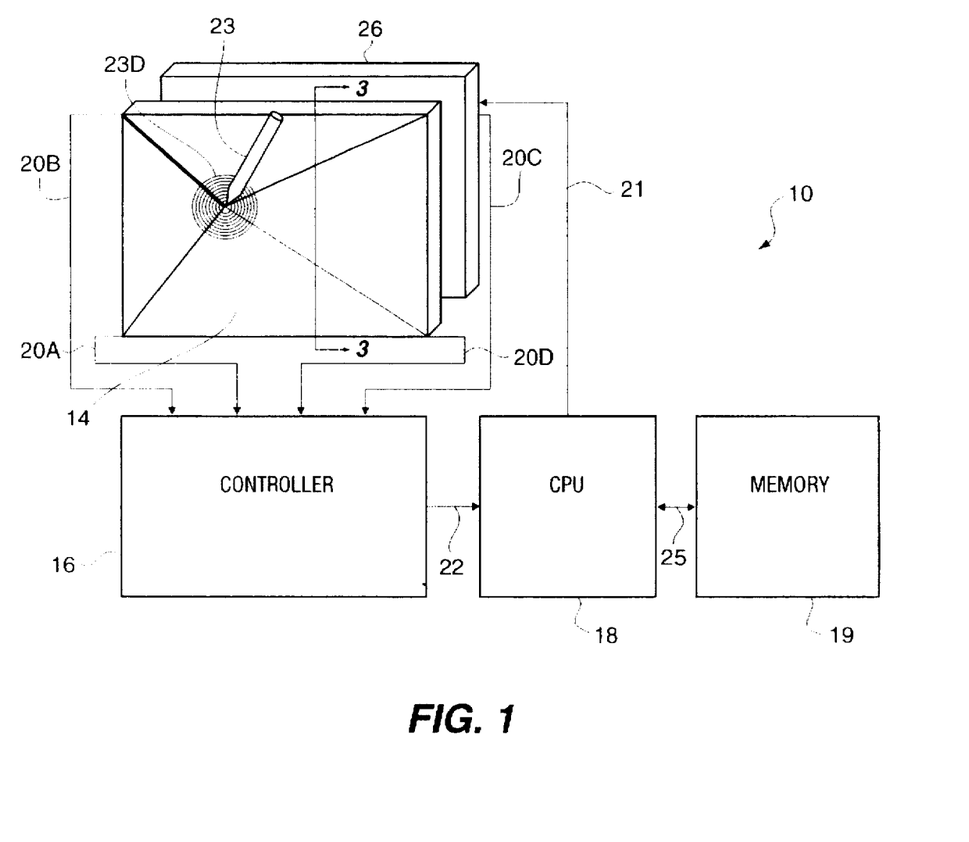
FIG. 1 is a simplified block diagram of an exemplary computer which incorporates the features of the present invention therein.

Referring now to FIG. 1, there is shown a functional block diagram of a computer 10 such as a notebook or mobile computer which incorporates the features of the present invention therein. The computer 10 includes an electrostatic digitizing tablet or panel 14, controller 16, conventional central processing unit (CPU) 18, random access memory (RAM) 19, and display device 26 such as a liquid crystal display (LCD). The digitizing panel 14 is operatively connected to the controller 16 through a number of corner wires 20a–20d. The CPU 18 is operatively connected to the display device 26 through a display interface 21. The controller 16 is operatively connected to the CPU 18 through a serial data line 22 such as a serial port, and the memory 19 is operatively connected to the CPU 18 through a system bus 25.

Figure 2:
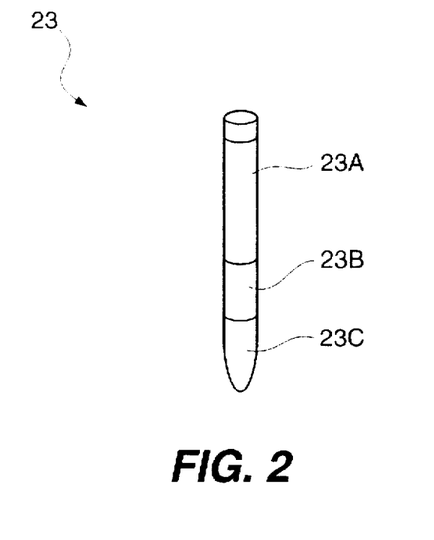
FIG. 2 is a perspective view of a stylus shown in FIG. 1.

A conventional hand-held pen or stylus 23 is used to input data into the computer 10 in a known manner, when the computer 10 is operating in a pen mode as described further below. Referring to FIG. 2, the stylus 23 may be a cordless-type stylus having at least a battery portion 23a, oscillator portion 23b and transmitter portion 23c. The battery portion 23a supplies power to the oscillator portion 23b which then stimulates a coil (not shown) associated with the transmitter portion 23c, to transmit an AC signal 23d (FIG. 1). In the embodiment being described, the signal 23d may have a carrier frequency of approximately 125 KHz.

Figure 3:
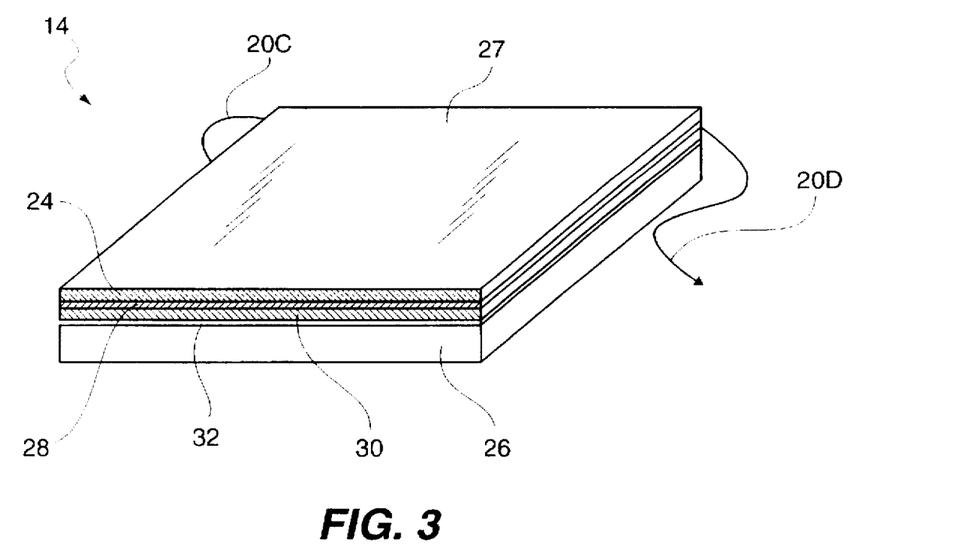
FIG. 3 is a perspective view of a digitizing panel and associated display device taken along the line 3—3 in FIG. 1.

The electrostatic digitizing panel 14 may include several layers or known material as shown in FIG. 3. In the embodiment being described, a glass layer 24 protects the display device 26 which is disposed below the glass layer 24. An upper surface 27 of the glass layer 24 defines a writing/touching surface for an object such as the stylus 23 or a user's finger (not shown). A lower surface of the glass layer 24 has a layer 28 of an active sensor material applied thereto. In the embodiment being described, the active sensor material may be a thin coating of transparent indium-tinoxide (ITO) which is typically used in electrostatic digitizing panel applications.

Each corner wire 20a–20d is electrically connected to a respective corner of the active ITO layer 28 for carrying current flow generated as a result of an object contacting the glass layer 24 as described further below. A polyester spall shield 30 is attached to the underside of the active ITO layer 28 to prevent the glass surface 24 from shattering if ever broken. A lower surface of the spall shield 30 may have an active ITO shield layer (not shown) applied thereto. The active ITO shield layer forms an electrical shield reducing noise coupling from the LCD screen 26 to the active ITO layer 28. An air gap 32 separates the lower surface of the spall shield 30 from an upper surface of the LCD screen 26.

The computer may operate in one of two modes, namely a touch mode, and a pen mode. In the touch mode of operation, the computer 10 is conventionally configured so as to bias the active ITO layer 28 with an AC signal from the controller 16 in a known manner. In particular, the controller 16 applies a 125 KHz biasing voltage to each corner of the active ITO layer 28 through the corner wires 20a–20d. As long as an object is not approaching the digitizing panel 14, the computer 10 in a quiescent state and a finite amount of AC offset current may flow through the corner wires 20a–20d due to loading effects caused by stray or parasitic capacitance between the active ITO layer 28 and any metal components of the computer 10 proximate the active ITO layer 28.

When an object does approach the digitizing panel 14, the object increasingly acts as a capacitive load that is coupled to the active ITO layer 28. An object that is capacitively coupled to the active ITO layer 28 acts as a load on the active ITO layer 28 which results in current flow through each of the corners of the active ITO layer 28, and through the corner wires 20a–20d. The controller 16 may determine a Cartesian coordinate (X, Y) position of an object such as a user's finger relative to the digitizing panel 14, based on the current flow in each of the corner wires 20a–20d in a manner known to one of ordinary skill in the art.

In the pen mode of operation, the computer 10 is conventionally configured so as to be receptive to the signal transmitted from the stylus 23. In particular, a current flow is generated in each of the corner wires 20a–20d in response to the signal transmitted from the stylus 23. The controller 16 may determine a Cartesian coordinate (X, Y) position of the stylus relative to the digitizing panel 14, based on the current flow in each of the corner wires 20a–20d in a manner known to one of ordinary skill in the art.

The magnitude of currernt flow through each of the corners of the active ITO layer 28 (and in each of the corner wires 20a–20d) due to an object (stylus or finger) which is capacitively coupled to the active ITO layer 28, is proportional to the conductivity of the active ITO layer 28 between each corner of the active ITO layer 28 and the object at a particular position on the glass layer 24 as shown in FIG. 1. More particularly, the relative thickness of the lines extending from the object position to each corner of the active ITO layer 28, is indicative of the magnitude of current flow through the respective corners of the active ITO layer 28 due to the position of the object relative to the active ITO layer 28.

Thus, the closer the object is to a particular corner of the active ITO layer 28, the greater the conductivity of the active ITO layer 28 and the greater the current flow through that corner, as depicted by the relative thickness of lines extending between the object position and each of the corners of the active, ITO layer 28. Likewise, the farther the object is from a particular corner of the active ITO layer 28, the lower the conductivity of the active ITO layer 28, and the lower the current flow through that corner.

Figure 4:
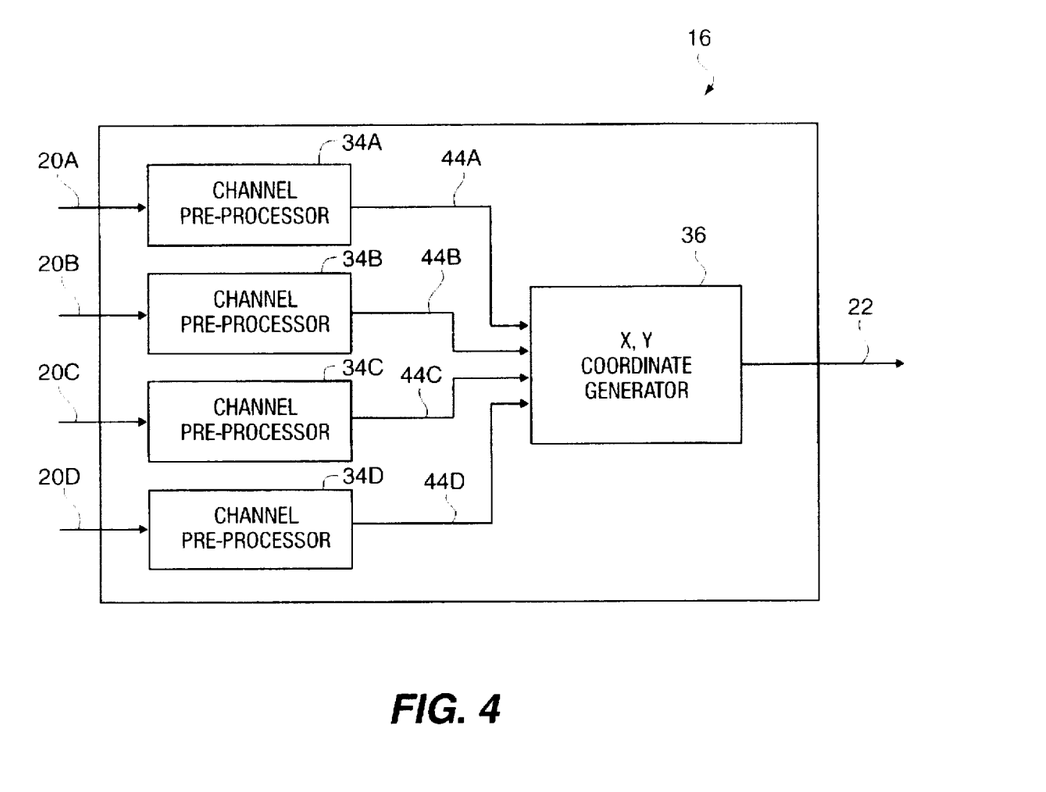
FIG. 4 is a block diagram of the controller shown in FIG. 1.

Referring now to FIG. 4, there is shown a simplified functional block diagram of the controller 16. In particular, the controller 16 includes a number of corner signal or channel pre-processors 34a–34d, and an X, Y coordinate generator 36. The corner signal pro-processors 34a–34d conventionaily convert the current flowing through the respective corner wires 20a–20d into analog voltage signals. The analog voltage signals have amplitudes which are indicative of the magnitude of current flowing through the respective corner wires 20a–20d. The current flowing through the corner wires 20a–20d is substantially attributable to an object contacting the digitizing panel 14 as previously described above.

In addition, the corner signal pre-processors 34a–34d typically filter, rectify and convert the analog voltage signals into digital values in a known manner prior to placing the digital values on lines 44a–44d. In the embodiment being described, the analog voltage signals may be converted into digital values at a sampling rate of approximately 100 samples/second. In addition, each of the corner signal pre-processors 34a–34d conventionally supplies an AC signal to the respective corner wires 20a–20d for stimulating the active ITO sensor layer 28 when the computer 10 is operated in the touch mode. The digital values on lines 44a–44d have binary representations that are indicative of the magnitude of current flowing through the respective corner wires 20a–20d.

The X, Y coordinate generator 36 inputs the digital values on lines 44a–44d for use in determining the Cartesian coordinates (X, Y) of the object relative to the digitizing panel 14 in a known manner. In particular, the position of an object relative to the digitizing panel 14 may be determined based upon a ratio of the digital values which represent the magnitudes of current flow through the corners of the active ITO layer 28.

In the embodiment being described, the resulting X-coordinate value is expressed as a fraction of the width of the digitizing panel 14, and the resulting Y-coordinate value is expressed as a fraction of the height of the digitizing panel 14. The resulting X, Y coordination value is output from the X, Y coordinate generator 36 and reported to the CPU 18 on line 22. The CPU 18 may use the reported X, Y coordinate value on line 22 for generating digital ink (i.e. activating one or more LCD pixels) on the display device 26.

It should be appreciated that an important performance characteristic of the computer 10 is the ability to accurately replicate or otherwise display the position of an object (e. g. stylus or user's finger) that contacts the digitizing panel 14. However, if the display device 26 is physically and/or mechanically misaligned with the digitizing panel 14, then the LCD pixel or pixels that are activated by the CPU 18 may not substantially correspond to the X, Y coordinate position reported to the CPU 18 by the controller 16. Several factors may cause the display device 26 to be misaligned with the digitizing panel 14 such as channel gain mismatch, offset misalignment, scale misalignment, and skew misalignment.

Channel gain mismatch may be defined as the relative gain mismatch between the channel pre-processors 34a–34d which generate values indicative of the corner current amplitudes of the active ITO sensor layer 28. For example, if the channel pro-processor 34d is used as a reference, (i.e. deemed to have a gain value of 1), then the channel pre-processor 34c may have a gain value of 1.05 relative to channel pre-processor 34d. Therefore, if the channel pre-processor 34d were to generate a value of 2 for a detected current, the channel pre-processor 34c would generate a value of 2.1 for a current of the same magnitude.

The CPU 18 may compensate or otherwise correct for the above-described channel gain mismatches by using equations 1a and 1b:

$$Xc = \frac{Xr \cdot ((gc\_2 - 1) \cdot Yr + 1)}{gc\_0 + (gc\_1 - gc\_0) \cdot Yr + (1 - gc\_0) \cdot Xr + (gc\_0 - gc\_1 + gc\_2 - 1) \cdot Xr \cdot Yr} \quad (1a)$$

$$Yc = \frac{Yr \cdot ((gc\_2 - gc\_1) \cdot Xr + gc\_1)}{gc\_0 + (gc\_1 - gc\_0) \cdot Yr + (1 - gc\_0) \cdot Xr + (gc\_0 - gc\_1 + gc\_2 - 1) \cdot Xr \cdot Yr} \quad (1b)$$

where Xr and Yr are the X, Y coordinate values reported to the CPU 18 from the controller 16 on line 22; Xc and Yc are the resulting X, Y coordinate values which have been corrected for channel gain mismatch; and gc_0, gc_1, gc_2 are channel gain values of channel pre-processors 34a–34c relative to the channel pre-processor 34d. As described in greater detail below, the CPU 18 approximates the channel gain values gc_0, gc_1, and gc_2 by using an optimization method to obtain an approximate solution to a system of equations.

Figure 5A:
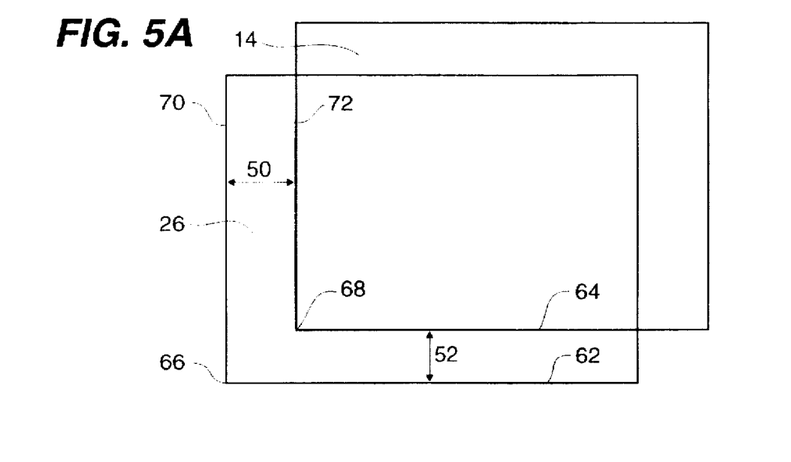
FIG. 5A shows an example of offset misalignment between the absolute origin of the digitizing panel and the absolute origin of the display device.

Referring now to FIG. 5A, there is shown an example of offset misalignment between the absolute origin 66 of the display device 26 and the absolute origin 68 of the digitizing panel 14. Offset misalignment may be the result of joining the digitizing panel 14 and the display device 26 together in such a manner that the position of the absolute origin 66 of the display device 26 is different from the position of the absolute origin 68 of the digitizing panel 14.

Offset misalignment may be characterized by two values, namely, an offset_x value 50 and an offset_y value 52. The offset_x value 50 represents the distance between the y-axis 70 of the display device 26 and the y-axis 72 of the digitizing panel 14. The offset_y value 52 represents the distance between the x-axis 62 of display device 26 and the x-axis 64 of the digitizing panel 14.

For example, if the offset_x value 50 is equal to 3 display units, and the offset_y value 52 is equal to 4 display units and the stylus 23 is positioned at the origin 68 of the digitizing panel 14, the X, Y coordinate reported to the CPU 18 on line 22 wound be (0, 0). If the CPU 18 were to cause a pixel(s) of the display device 26 which corresponds to the reported X, Y coordinate (0, 0) to be activated, the resulting digital ink would be displayed at the origin 66 of the display device 28 which is not in alignment with the position of the stylus 23. However, if the CPU 18 causes the pixel(s) which corresponds to a offset-corrected X, Y coordinate (3, 4) to be activated, then the digital ink would be in alignment with the position of the stylus 23.

The CPU 18 may compensate or otherwise correct for the above-described offset misalignment by using equations 2a and 2b:

$$Xc = Xr + \text{offset\_x} \quad (2a)$$

$$Yc = Yr + \text{offset\_y} \quad (2b)$$

where Ar and Yr are the X, Y Coordinate values reported to the CPU 18 from the controller 16 on line 22; Xc and Yc are the resulting X, Y coordinate values which have been corrected for offset misalignment; offset_x represents the distance 50 between the y-axis 70 of the digitizing panel 26 and the y-axis 72 of the display device 14, and offset_y represents the distance 52 between the x-axis 62 of the display device 26 and the x-axis 64 of the digitizing panel 14. As described in greater detail below, the CPU 18 approximates the offset misalignment values offset_x and offset_y by using a known optimization method to obtain an approximate solution to a system of equations.

Figure 5B:
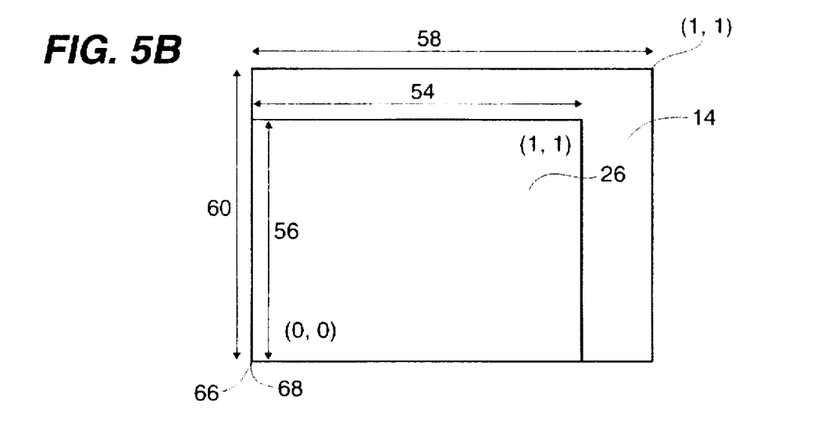
FIG. 5B shows an example of scale misalignment between the digitizing panel and the display device.

Referring now to FIG. 5B, there is shown an example of scale misalignment between the digitizing panel 14 and the display device 26. Scale misalignment is caused by the distance per coordinate unit of the digitizing panel 14 being different than the distance per coordinate unit of the display device 26. Scale misalignment is comprised of a scale_x value and a scale_y value. The scale_x value is defined as the ratio of the distance 58 of the digitizing panel 14 over the distance 54 of the display device 26. The scale_y value is defined as the ratio of the distance 60 of the digitizing panel 14 over the distance 56 of the display device 26.

For example, if the distance 58 is equal to 4 millimeters (mm) and the distance 54 is equal to 2 mm, then the scale_x value would be equal to 2. Furthermore, if the distance 60 is equal to 3 millimeters (mm) and the distance 56 is equal to 2 mm, then the scale_y value would be equal to 1.5. Therefore, if a stylus 23 were positioned at coordinate (30, 40) of the digitizing panel 14, the CPU 18 would need to cause a pixel(s) of the display device 26 which corresponds to a scale-corrected X, Y coordinate (60, 60) to be activated, in order for the digital ink to be in alignment with the position of the stylus 23.

The CPU 18 may compensate or otherwise correct for the above-described scale misalignment by using equations 3a and 3b:

$$Xc = \text{scale\_x} \cdot Xr \quad (3a)$$

$$Yc = \text{scale\_y} \cdot Yr \quad (3b)$$

where Xr and Yr are the X, Y coordinate values reported to the CPU 18 from the controller 16 on line 22; Xc and Yc are the resulting X, Y coordinate values which have been corrected for offset misalignment; scale_x represents a ratio of the distance 58 of the digitizing panel 14 over distance 54 of the display device 26, and scale_y represents a ratio of the distance 60 of the digitizing panel 14 over the distance 56 of the display device 26. As described in greater detail below, the CPU 18 approximates the scale misalignment values scale_x and scare_y by using a known optimization method to obtain an approximate solution to a system of equations.

Figure 5C:
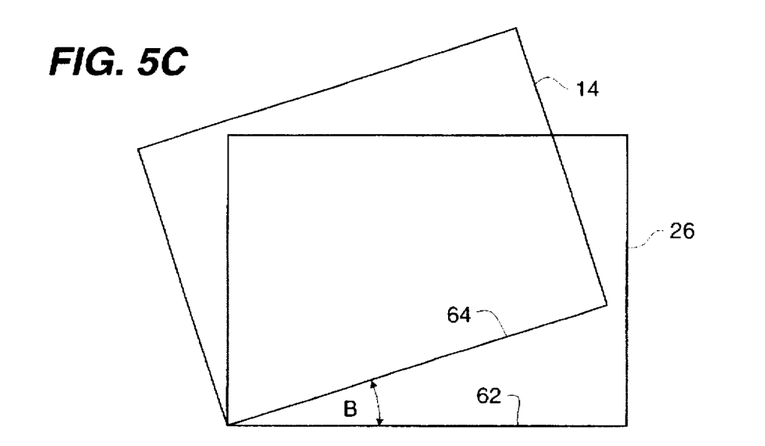
FIG. 5C shows an example of skew misalignmet between the digitizing panel and the display device.

Referring now to FIG. 5C, there is shown an example of skew misalignment between the digitizing panel 14 and the display device 26. Skew misalignment is due to an apparent rotation between the coordinate system of the digitizing panel 14 and the coordinate system of the display device 26. The apparent rotation may be expressed as a skew angle B between the base line or x-axis 62 of the display device 26 and the base line or x-axis 64 of the digitizing panel 14.

For example, if the skew angle B is equal to 36.87° and if a stylus 23 were positioned at coordinate (40, 30) of the digitizing panel 14, the CPU 18 would need to cause a pixel(s) of the display device 26 which corresponds to a skew-corrected X, Y coordinate (14, 48) to be activated, in order for the digital ink to be in alignment with the position of the stylus 23.

The CPU 18 may compensate or otherwise correct for the above-described skew misalignment by using equations 4a and 4b:

$$Xc = Xr \cdot \cos(B) - Yr \cdot \sin(B) \quad (4a)$$

$$YC = Xr \cdot \sin(B) + Yr \cdot \cos(B) \quad (4b)$$

where Xr and Yr are the X, Y coordinate values reported to the CPU 18 from the controller 16 on line 22; Xc and Yc are the resulting X, Y coordinate values which have been corrected for skew misalignment; and B represents a skew angle between the base line or x-axis 62 of the display device 26 and the base line or x-axis 64 of the digitizing panel 14. As described in greater detail below, the CPU 18 approximates the skew angle B by using a known optimization method to obtain an approximate solution to a system of equations.

Figure 6:
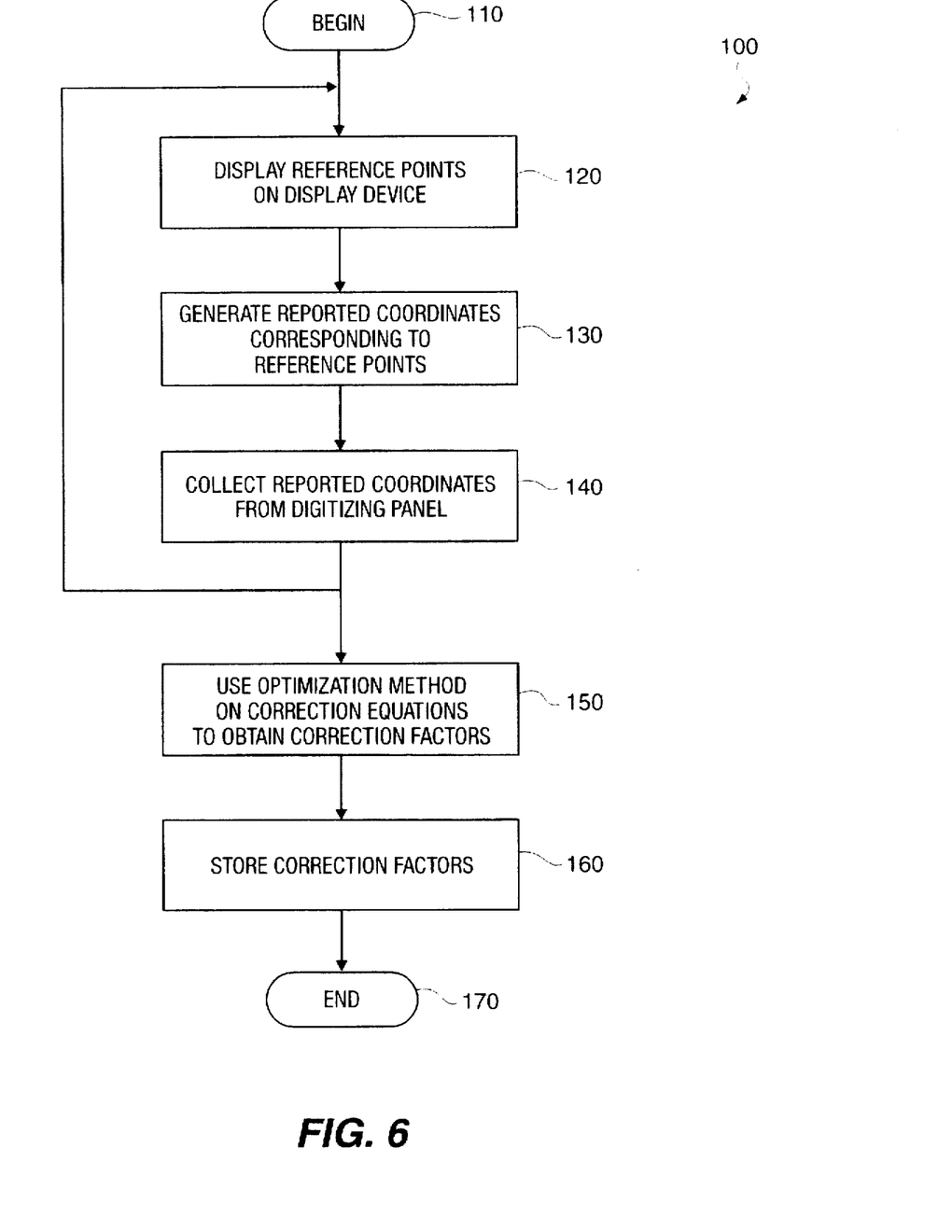
FIG. 6 is a procedural flowchart for calibrating or otherwise aligning the display device with the digitizing panel.

Referring now to FIG. 6, there is shown a procedural flowchart setting forth a routine 100 for calibrating or otherwise aligning the coordinates of the display device 26 with the coordinates of the digitizing panel 14. In particular, the routine 100 generates or determines a plurality of correction factors which may be used to compensate for channel gain mismatch, offset misalignment, scale misalignment, and skew misalignment as described above.

The routine 100 may be initiated by a user desiring to calibrate or recalibrate the computer 10 (step 110) It should be appreciated that the routine 100 may be performed on a periodic basis, or may be performed when a new user desires to operate the computer 10. In addition, the routine 100 may be performed in response to a determination by the computer 10 that alignment or calibration is needed.

Figure 7:
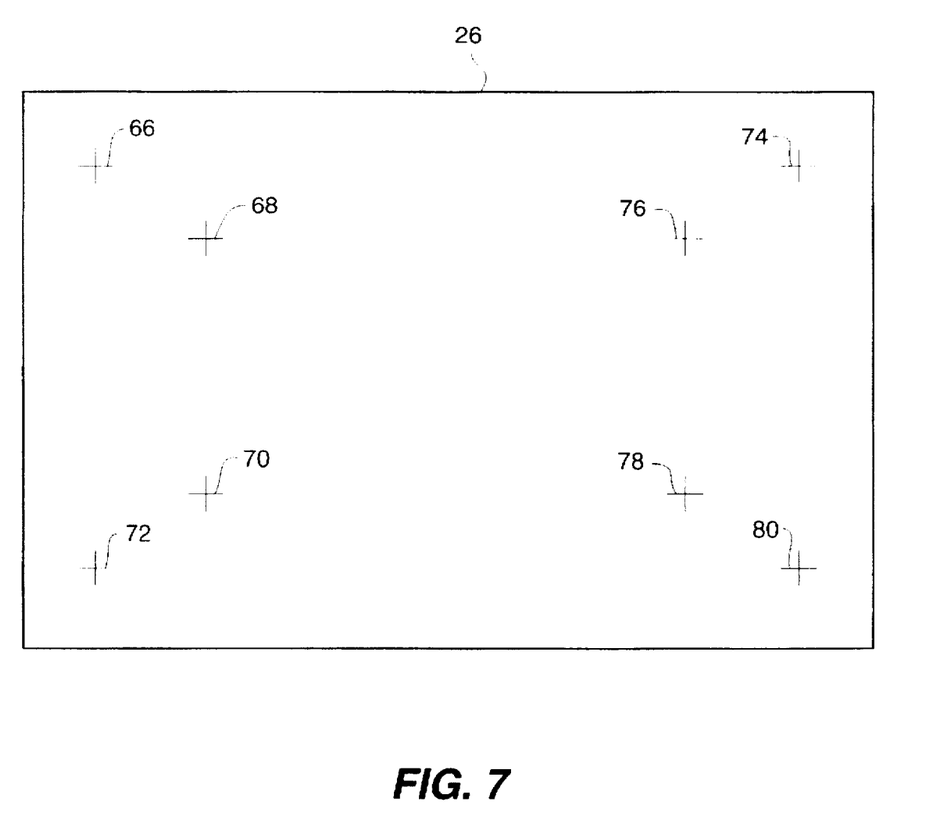
FIG. 7 shows a number of reference points displayed on the display device for use in determining correction factors.

The routine 100 causes a number of reference points to be consecutively displayed on the display screen 26. In particular, as shown in FIG. 7, the computer 10 causes a first reference point 66 to be displayed on the display device 26, and requests the user to peace the tip of an object (e.g. stylus 23 or user's finger) on the first reference point 66 (step 120).

Upon detecting the presence of the object, the controller 16 generates an X, Y coordinate value on line 22 which corresponds to the position of the object relative to the first reference point 66 (step 130).

The CPU 18 then stores the X, Y coordinate value reported from the controller 16 (step 140). The routine 100 then returns to step 120 wherein a second reference point 68 is displayed on the display device 26.

The computer 10 determines and stores the reported X, Y coordinate value for the object relative to the second reference point 68 in the same manner as described above with regard to the first reference point 66. The routine 100 repeats steps 120-140 until the computer 10 has collected and stored a predetermined number of reported X, Y coordinate values. In the embodiment being described, the computer 10 consecutively determines and stores eight (8) reported X, Y coordinate values corresponding to the eight (8) reference points 66-80 which are consecutively displayed on the display device 26.

It should be appreciated that the inaccuracy associated with the user touching the tip of an object (e.g. stylus) to a reference point can be minimized by providing a larger sample of reference points in which to touch. That is, the more reference points that the user is required to touch, the greater the likelihood that an inaccurate touch is averaged out.

After the eight (8) pairs of X, Y coordinate values have been reported to and stored by the CPU 18, the computer 10 uses the eight (8) pairs of reported X, Y coordinate values to approximate eight correction values or factors, namely, the channel gain values gc_0, gc_1, and gc_2; offset values offset_x and offset_y, scale values scale_x and scale_y; and the skew angle B (step 150). The computer 10 approximates the eight correction factors by obtaining an approximate solution to a system of correction equations (5):

$$X_0 = \frac{Xr \cdot ((gc\_2 - 1) \cdot Yr + 1)}{gc\_0 + (gc\_1 - gc\_0) \cdot Yr + (1 - gc\_0) \cdot Xr + (gc\_0 - gc\_1 + gc\_2 - 1) \cdot Xr \cdot Yr} \quad (5a)$$

$$Y_0 = \frac{Yr \cdot ((gc\_2 - gc\_1) \cdot Xr + gc\_1)}{gc\_0 + (gc\_1 - gc\_0) \cdot Yr + (1 - gc\_0) \cdot Xr + (gc\_0 - gc\_1 + gc\_2 - 1) \cdot Xr \cdot Yr} \quad (5b)$$

$$X_1 = scale\_x \cdot X_0 + offset\_x \quad (5c)$$

$$Y_1 = scale\_y \cdot Y_0 + offset\_y \quad (5d)$$

$$X_{ref} = X_1 \cdot \cos(B) - Y_1 \cdot \sin(B) \quad (5e)$$

$$Y_{ref} = X_1 \cdot \sin(B) + Y_1 \cdot \cos(B) \quad (5f)$$

where Xr and Yr are the coordinate values reported by the controller 16 to the CPU 18; $X_0$ and $Y_0$ are the Xr and Yr coordinate values adjusted for channel gain mismatch, $X_1$ and $Y_1$ are the $X_0$ and $Y_0$ coordinate values further adjusted for scale and offset misalignment, Xref and Yref are the X and Y coordinate values for one of the reference points 66-80 which are consecutively displayed on the display device 26 in step 120.

It should be appreciated that equations 5a and 5b correspond with equations 1a and 1b, respectively. Equation 5c corresponds with the combination of equations 2a and 3a, equation 5d corresponds with the combination of equations 2b and 3b, and equations 5e and 5f correspond with equations 4a and 4b, respectively.

In the embodiment being described, the well-known Broyden-Fletcher-Shanno optimization method may be used to obtain values for the gc_0, gc_1, gc_2, scale_x, scale_y, offset_x, offset_y, and B correction factors. The Broyden-Fetcher-Shanno optimization method generally derives the correction factors gc_0, gc_1, gc_2, scale_x, scale_y, offset_x, offset_y, and B so as to minimize the sum of the square distances between each corrected coordinate (Xc, Yc) and the corresponding reference coordinate (Xr, Yr) which was reported to the CPU 18 from the digitizing panel. It should be appreciated that known optimization methods other than the Broyden-Fletcher-Shanno method may be effective in deriving the correction factors gc_0, gc_1, gc_2, scale_x, scale_y, offset_x, offset_y, and B so as to minimize the sum of the square distances between each corrected coordinate (Xc, Yc) and the corresponding reference coordinate (Xr, Yr).

After the Broyden-Fletcher Shanno optimization method has derived values for the correction factors gc_0, gc_1, gc_2, scale_x, scale_y, offset_x, offset_y, and B, the values are stored in memory 19 (step 160). The derived values for the correction factors may also be stored in a non-volatile storage (not shown) so that the correction factors will be available to the computer 10 during subsequent uses thereof. The routine 100 ends after the values for the correction factors are stored (step 170).

Figure 8:
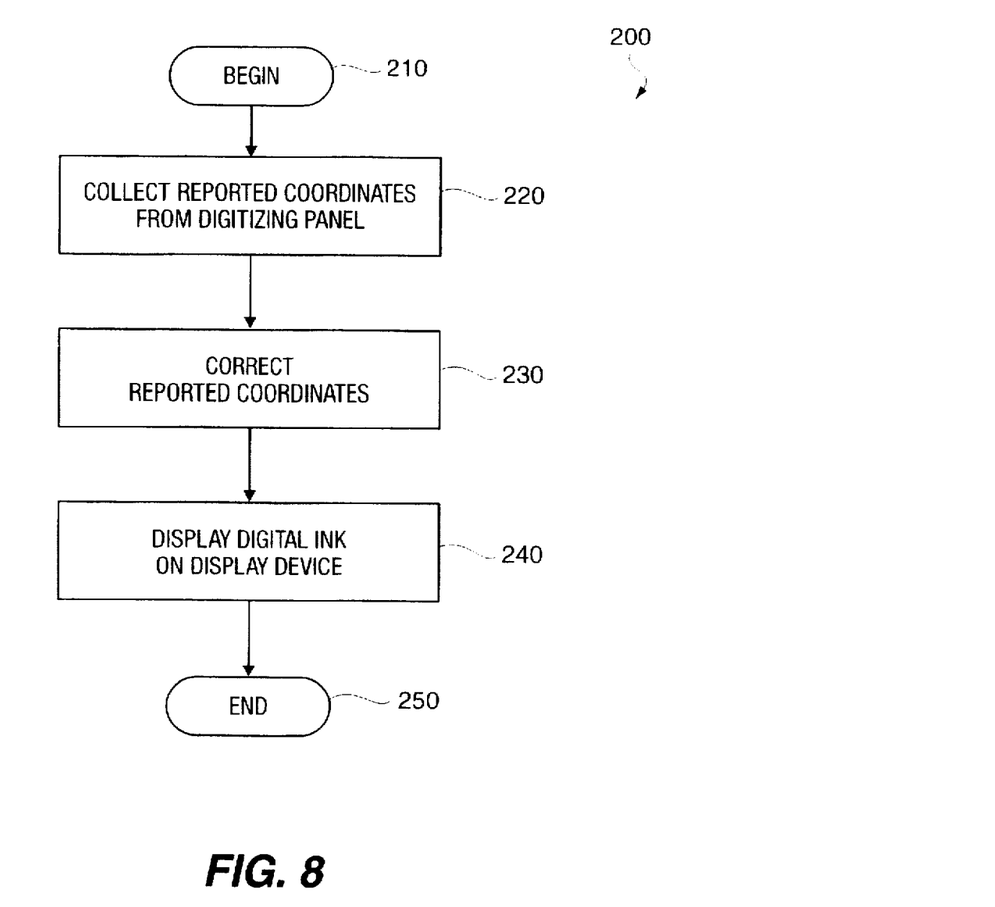
FIG. 8 is a flowchart for implementing an X, Y coordinate correction routine.

Referring now to FIG. 8, there is shown an exemplary flowchart for implementing a reported X, Y coordinate correction routine or procedure 200. The correction routine 200 obtains a corrected X, Y coordinate pair (Xc, Yc) for display on display device 26 which is substantially in alignment with a reported X, Y coordinate pair (Xr, Yr) from the digitizing panel 14.

The correction routine 200 is utilized during normal operation of the computer 10. The controller 16 generates an Xr, Yr coordinate pair which corresponds to a position of an object proximate or in contact with the digitizing panel 14 which begins the routine 200 (step 210). The CPU 18 receives the reported Xr, Yr coordinate pair from the controller 16 via the serial data line 22 (step 220).

In step 230, the CPU 18 applies the reported Xr, Yr coordinate pair and the values of the correction factors gc_0, gc_1, gc_2, scale_x, scale_y, offset_x, offset_y, and B which were stored in step 160 of the calibration or alignment routine 100, to a system of correction equations (6a–6f) to obtain or otherwise solve for a pair of corrected X, Y coordinates (Xc, Yc):

$$X_0 = \frac{Xr \cdot ((gc\_2 - 1) \cdot Yr + 1)}{gc\_0 + (gc\_1 - gc\_0) \cdot Yr + (1 - gc\_0) \cdot Xr + (gc\_0 - gc\_1 + gc\_2 - 1) \cdot Xr \cdot Yr} \quad (6a)$$

$$Y_0 = \frac{Yr \cdot ((gc\_2 - gc\_1) \cdot Xr + gc\_1)}{gc\_0 + (gc\_1 - gc\_0) \cdot Yr + (1 - gc\_0) \cdot Xr + (gc\_0 - gc\_1 + gc\_2 - 1) \cdot Xr \cdot Yr} \quad (6b)$$

$$X_1 = scale\_x \cdot X_0 + offset\_x \quad (6c)$$

$$Y_1 = scale\_y \cdot Y_0 + offset\_y \quad (6d)$$

$$Xc = X_1 \cdot \cos(B) - Y_1 \cdot \sin(B) \quad (6e)$$

$$Yc = X_1 \cdot \sin(B) + Y_1 \cdot \cos(B) \quad (6f)$$

where Xr and Yr are the coordinate values reported by the controller 16 to the CPU 18; $X_0$ and $Y_0$ are the Xr and Yr coordinate values adjusted for channel gain mismatch, $X_1$ and $Y_1$ are the $X_0$ and $Y_0$ coordinate values further adjusted for scale and offset misalignment, Xc and Yc are the corrected $X_1$ and $Y_1$ coordinate values further adjusted for skew misalignment.

It should be appreciated that the set of equations 5a–5f are the same as the set of equations 6a–6f with the only distinction being that in equations 5e and 5f, the Xref, Yref values are input into the equations 5e and 5f in order to obtain values for the correction factors gc_0, gc_1, gc_2, scale_x, scale_y, offset_x, offset_y, and B. Whereas, in equation 6e and 6f, Xc, Yc are the resulting corrected X, Y coordinates which are solved for and subsequently sent to the display device 26 via the display interface 21.

In step 240, the CPU 18 causes the pixel(s) of the display device 26 which correspond to the corrected X, Y coordinate pair (Xc, Yc) to be activated, thereby displaying digital ink substantially underneath and in alignment with the position of the object relative to the digitizing panel 14.

In sum, what has been disclosed is a method and apparatus for correcting offset, scaling, skew, and channel gain mismatch while permitting a greater number of reference points to be used than could be used by directly solving a system of correction equations.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method for aligning a first coordinate system of a digitizing panel with a second coordinate system of a display device, comprising the steps of:

displaying a plurality of reference points on the display device, each of said reference points having a $X_{ref}$, $Y_{ref}$ coordinate value;

determining a plurality of first Xr, Yr coordinate values from the digitizing panel which are indicative of a plurality of positions of an object positioned relative to said plurality of reference points;

determining a plurality of channel gain correction values from said plurality of first Xr, Yr coordinate values and said plurality of $X_{ref}$, $Y_{ref}$ coordinate values; and     storing said plurality of channel gain correction values for use in correcting a second Xr, Yr coordinate value which is indicative of a position of an object relative to said digitizing panel.

2. The method of claim 1, wherein said step of determining a plurality of channel gain correction values includes the step of:

determining a first channel gain mismatch value (gc_0), a second channel gain mismatch value (gc_1), and a third channel gain mismatch value (gc_2).

3. The method of claim 2, further including the steps of:

determining at least one misalignment correction value from said plurality of first Xr, Yr coordinate values and said plurality of $X_{ref}$, $Y_{ref}$ coordinate values; and     storing said at least one misalignment correction value for use in correcting said second Xr, Yr coordinate value.

4. The method of claim 3, wherein said step of determining at least one misalignment correction value includes the step of:

determining a first misalignment correction value (offset_x), a second misalignment correction value (offset_y), a third misalignment correction value (scale_x), a fourth misalignment correction value (scale_y), and a fifth misalignment correction value (skew angle B).

5. The method of claim 4, including the steps of:

applying said plurality of $X_{ref}$, $Y_{ref}$ coordinate values and said plurality of first Xr, Yr coordinate values to a system of correction equations; and     optimizing said system of correction equations to obtain said plurality of channel gain correction values and said plurality of misalignment correction values.

6. The method of claim 5, wherein said step of optimizing said system of equations includes the step of:

manipulating said plurality of channel gain correction values and said plurality of misalignment correction values until a sum of square distances between said plurality of $X_{ref}$, $Y_{ref}$ coordinate values and said plurality of first Xr, Yr coordinate values which have been corrected by said system of correction equations, is minimized.

7. The method of claim 5, wherein said system of correction equations includes:

$$Xref = \frac{Xr \cdot ((gc\_2 - 1) \cdot Yr + 1)}{gc\_0 + (gc\_1 - gc\_0) \cdot Yr + (1 - gc\_0) \cdot Xr + (gc\_0 - gc\_1 + gc\_2 - 1) \cdot Xr \cdot Yr)}$$

$$Yref = \frac{Yr \cdot ((gc\_2 - gc\_1) \cdot Xr + gc\_1)}{gc\_0 + (gc\_1 - gc\_0) \cdot Yr + (1 - gc\_0) \cdot Xr + (gc\_0 - gc\_1 + gc\_2 - 1) \cdot Xr \cdot Yr)}$$

8. The method of claim 5, wherein said system of correction equations includes:

$$X_0 = \frac{Xr \cdot ((gc\_2 - 1) \cdot Yr + 1)}{gc\_0 + (gc\_1 - gc\_0) \cdot Yr + (1 - gc\_0) \cdot Xr + (gc\_0 - gc\_1 + gc\_2 - 1) \cdot Xr \cdot Yr)}$$

$$Y_0 = \frac{Yr \cdot ((gc\_2 - gc\_1) \cdot Xr + gc\_1)}{gc\_0 + (gc\_1 - gc\_0) \cdot Yr + (1 - gc\_0) \cdot Xr + (gc\_0 - gc\_1 + gc\_2 - 1) \cdot Xr \cdot Yr)}$$

$X_1 = scale\_x \cdot X_0 + offset\_x$ $Y_1 = scale\_y \cdot Y_0 + offset\_y$ $Xref = Xc = X_1 \cdot cos(B) - Y_1 \cdot sin(B)$ $Yref = Yc = X_1 \cdot sin(B) + Y_1 \cdot cos(B)$.

9. The method of claim 8, further including the step of:
determining a corrected Xc, Yc coordinate value for display on the display device from (1) said second Xr, Yr coordinate value reported by the digitizing panel, (2) said plurality of channel gain correction values (3) said plurality of misalignment correction values, and (4) said system of correction equations.

10. The method of claim 9, wherein said step of optimizing said system of equations includes the step of:
using a Broyden-Fletcher-Shanno optimization method to obtain said plurality of channel gain correction values and said plurality of misalignment correction values.

11. A computer comprising:
a display device for displaying a plurality of reference points, each of said plurality of reference points having a $X_{ref}$, $Y_{ref}$ coordinate value;
a digitizing panel mounted over said display device and having a resistive layer associated therewith;
a plurality of channel pre-processors each connected to a respective corner of said resistive layer;
a X, Y coordinate generator coupled to said channel pre-processors and configured to generate a plurality of Xr, Yr coordinate values indicative of a plurality of positions of an object positioned relative to said plurality of reference points; and
means for obtaining a plurality of channel gain correction values from said plurality of Xr, Yr coordinate values and said plurality of $X_{ref}$, $Y_{ref}$ coordinate values.

12. The computer of claim 11, wherein:
said plurality of channel gain correction values includes a first channel gain mismatch value (gc_0), a second channel gain mismatch value (gc_1), and a third channel gain mismatch value (gc_2).

13. The computer of claim 12, further including:
means for obtaining a plurality of misalignment correction values from said plurality of Xr, Yr coordinate values and said plurality of $X_{ref}$, $Y_{ref}$ coordinate values.

14. The computer of claim 13, wherein said plurality of misalignment correction values include a first misalignment correction value (offset_x), a second misalignment correction value (offset_y), a third misalignment correction value (scale_x), a fourth misalignment correction value (scale_y), and a fifth misalignment correction value (skew angle B).

15. The computer of claim 14, further including:
means for applying said plurality of $X_{ref}$, $Y_{ref}$ coordinate values and said plurality of first Xr, Yr coordinate values to a system of correction equations; and
means for optimizing said system of correction equations to obtain said plurality of channel gain correction values and said plurality of misalignment correction values.

16. The computer of claim 15, further including:
means for manipulating said purality of channel gain correction values and said plurality of misalignment correction values until a sum of square distances between said plurality of $X_{ref}$, $Y_{ref}$ coordinate values and said plurality of first Xr, Yr coordinate values which have been corrected by said system of correction equations, is minimized.

17. The computer of claim 15, wherein said system of correction equations includes:

$$Xref = \frac{Xr \cdot ((gc\_2 - 1) \cdot Yr + 1)}{gc\_0 + (gc\_1 - gc\_0) \cdot Yr + (1 - gc\_0) \cdot Xr + (gc\_0 - gc\_1 + gc\_2 - 1) \cdot Xr \cdot Yr)}$$

$$Yref = \frac{Yr \cdot ((gc\_2 - gc\_1) \cdot Xr + gc\_1)}{gc\_0 + (gc\_1 - gc\_0) \cdot Yr + (1 - gc\_0) \cdot Xr + (gc\_0 - gc\_1 + gc\_2 - 1) \cdot Xr \cdot Yr)}$$

18. The computer of claim 15, wherein said system of correction equations includes:

$$X_0 = \frac{Xr \cdot ((gc\_2 - 1) \cdot Yr + 1)}{gc\_0 + (gc\_1 - gc\_0) \cdot Yr + (1 - gc\_0) \cdot Xr + (gc\_0 - gc\_1 + gc\_2 - 1) \cdot Xr \cdot Yr)}$$

$$Y_0 = \frac{Yr \cdot ((gc\_2 - gc\_1) \cdot Xr + gc\_1)}{gc\_0 + (gc\_1 - gc\_0) \cdot Yr + (1 - gc\_0) \cdot Xr + (gc\_0 - gc\_1 + gc\_2 - 1) \cdot Xr \cdot Yr)}$$

$X_1 = scale\_x \cdot X_0 + offset\_x$ $Y_1 = scale\_y \cdot Y_0 + offset\_y$ $Xref = Xc = X_1 \cdot cos(B) - Y_1 \cdot sin(B)$ $Yref = Yc = X_1 \cdot sin(B) + Y_1 \cdot cos(B)$.

19. The computer of claim 18, further including:
means for determining a corrected Xc, Yc coordinate value for display on the display device from (1) said second Xr, Yr coordinate value reported by the digitizing panel, (2) said plurality of channel gain correction values (3) said plurality of misalignment correction values, and (4) said system of correction equations.

20. The computer of claim 19, further including:
means for implementing a Broyden-Fletcher-Shanno optimization technique to obtain said plurality of channel gain correction values and said plurality of misalignment correction values.

21. A method for aligning a first coordinate system of a digitizing panel with a second coordinate system of a display device, comprising the steps of:
displaying a plurality of reference points on the display device, each of said reference points having a $X_{ref}$, $Y_{ref}$ coordinate value;

determining a plurality of first Xr, Yr coordinate values from the digitizing panel which are indicative of a plurality of positions of an object positioned relative to said plurality of reference points; and determining a plurality of channel gain correction values from said plurality of first Xr, Yr coordinate values and said plurality of $X_{ref}$, $Y_{ref}$ coordinate values for use in correcting a second Xr, Yr coordinate value which is indicative of a position of an object relative to said digitizing panel.

* * * * *